United States Patent
Jin

(10) Patent No.: US 7,231,127 B2
(45) Date of Patent: Jun. 12, 2007

(54) WAVEGUIDE DEVICES WITH LOW LOSS CLADS AND TUNABLE REFRACTIVE INDICES

(75) Inventor: Dan L. Jin, Bothell, WA (US)

(73) Assignee: Lumera Corporation, Bothell, WA (US)

( * ) Notice: Subject to any disclaimer, the term of this patent is extended or adjusted under 35 U.S.C. 154(b) by 37 days.

(21) Appl. No.: 11/040,819

(22) Filed: Jan. 21, 2005

(65) Prior Publication Data

US 2006/0165369 A1    Jul. 27, 2006

(51) Int. Cl.
*G02B 6/00*    (2006.01)
(52) U.S. Cl. ..................................... 385/145
(58) Field of Classification Search ............. None
See application file for complete search history.

(56) References Cited

U.S. PATENT DOCUMENTS

| | | | | |
|---|---|---|---|---|
| 5,414,791 A | * | 5/1995 | Ermer et al. ............. | 385/143 |
| 6,005,137 A | * | 12/1999 | Moore et al. ............. | 560/139 |
| 6,750,603 B2 | | 6/2004 | Huang et al. | |
| 7,016,580 B1 | * | 3/2006 | Gharavi ................ | 385/122 |
| 2002/0009274 A1 | * | 1/2002 | Gharavi ................ | 385/122 |

FOREIGN PATENT DOCUMENTS

EP        0482779 A2 *  4/1992

OTHER PUBLICATIONS

Ling et al., "dc electrical behavior of polymers used in electro-optic devices," *J. Appl. Phys.*, 1991, 70(11):6669-6673 (Dec.).
Barto et al, "Recent Progress in Fabricating Wideband Polymer Electropic Modulators for Space Applications," *ACS Poly. Mater. Sci. Eng.*, 2000, 83:167-169 (Aug.).
Oh et al., "Recent Advances in Electrooptic Polymer Modulators Incorporating Highly Nonlinear Chromophore," *IEEE J. Sel. Top. Q. Electron.*, 2001, 7(5):826-835 (Sep./Oct.).

* cited by examiner

*Primary Examiner*—Rodney Bovernick
*Assistant Examiner*—Mike Stahl
(74) *Attorney, Agent, or Firm*—Fish & Richardson P.C.

(57) ABSTRACT

Optical waveguide devices that include a polymer clad and a polymer core where the clad includes constitutional units contributed by (a) a monomer selected from the group consisting of a halocatechol diacrylate, a haloresorcinol diacrylate, and a haldhydroquinone diacrylate, and/or (b) a charge transport moiety.

1 Claim, No Drawings

WAVEGUIDE DEVICES WITH LOW LOSS CLADS AND TUNABLE REFRACTIVE INDICES

STATEMENT OF RELATED CASES

This application is related to the following concurrently filed, commonly assigned eases, each of which is incorporated by reference: (a) Jin, "Crosslinked Polymers with Low Loss and Tunable Refractive Indices," U.S.S.N. 20060167212 (Ser. No. 11/041,017), and (b) Jin, "Process of Preparing Crosslinked, Low Loss Polymers With Tunable Refractive Indices," U.S.S.N. 20060167213 (Ser. No. 11/041,080).

BACKGROUND OF THE INVENTION

All patents, patent applications, and publications cited within this application are incorporated herein by reference to the same extent as if each individual patent, patent application, or publication was specifically and individually incorporated by reference.

UV curable polymers have been used in the fabrication of passive and active (e.g., electro-optic) optical waveguide devices. One of the main advantages of UV curable polymers is that they become solvent resistant on crosslinking, which allows subsequent polymer layers to be deposited. Additionally, UV curing can be accomplished at lower temperatures than thermal curing, which may avoid problems like cracks or loss of adhesion due to thermal expansion mismatches with the substrate or other polymer layers. UV curable polymers are particularly advantageous for the fabrication of electro-optic (EO) polymer devices since avoiding high temperature thermal curing is crucial to preserve poling induced EO activity and the structural integrity of the chromophore. However, commercially available UV curable polymers typically are unsuitable for developing commercially viable electro-optic polymer devices. For example, of the number of commercially available passive polymers, UV-15 from Masterbond has been used for many years to fabricate electro-optic polymer devices even though it has relatively high optical loss and undesirable mechanical strength after the fabrication process, which provides little protection of stacks from process damage (see, for example, H. C Ling, et al., *J. Appl. Phys.* 70(11), 6669 (1991); R. R. Barto, et al., *ACS Poly. Mater. Sci. Eng.* 83, 167 (2000); and M. -C. Oh, et al., *IEEE J. Sel. Top. Q. Chem.* 7(5), 826, (2001). Other properties that are important for electro-optic polymer devices and need to be improved over current commercially available polymers include conductivity around the poling temperature of the electro-optic polymer core, dielectric constant at operating temperatures and frequency, and properties related DC bias drift.

SUMMARY

One embodiment is an optical waveguide device comprising at least one polymer clad and a polymer core, wherein the polymer clad comprises a constitutional unit contributed by a monomer chosen from the group consisting of a halocatechol diacrylate, a haloresorcinol diacrylate, and a halohydroquinone diacrylate. In another embodiment, the polymer core is an electro-optic polymer. In other embodiments, for example when the core polymer is an electro-optic polymer, the clad polymer may further comprise a constitutional unit that includes a charge transport moiety. In another embodiment, an optical waveguide device comprises at least one polymer clad and a polymer core, wherein the polymer clad comprises a constitutional unit that includes a charge transport moiety and the polymer core is an electro-optic polymer.

Another embodiment is a polymer including a constitutional unit contributed by a first monomer and a constitutional unit contributed by second monomer, the first monomer comprising a halocatechol diacrylate, a haloresorcinol diacrylate, or a halohydroquinone diacrylate and the second monomer comprising a charge transporting moiety.

A further embodiment is a process comprising a) providing a mixture including i) a halocatechol diacrylate, a haloresorcinol diacrylate, or a halohydroquinone diacrylate component, ii) a charge transporting component having a radical polymerizable group, and iii) a radical initiator and b) initiating a radical polymerization. The materials show less electrical resistance relative to the core electro-optic polymer over a broad temperature range during the poling process, low optical loss, and desirable dielectric constant values. Electro-optic devices fabricated with these materials show reduced $V_\pi$ and reduced DC bias drift compared to devices fabricated with UV-15.

Other features and advantages will be apparent from the Detailed Description and from the Claims.

DETAILED DESCRIPTION

One embodiment is an optical waveguide device comprising at least one polymer clad and a polymer core, wherein the polymer clad comprises a constitutional unit contributed by a monomer chosen from the group consisting of a halocatechol diacrylate, a haloresorcinol diacrylate, and a halohydroquinone diacrylate. What is meant by "constitutional unit" and "monomer" can be found in the *IUPAC Compendium of Chemical Technology*, $2^{nd}$ edition 1997, published by the International Union of Pure and Applied Chemist. Preferably, the monomer is chosen from the group consisting of

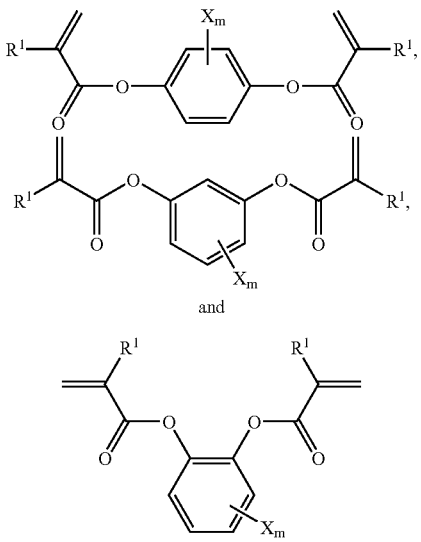

and wherein X is a halogen; $R^1$ is independently at each occurrence a hydrogen, a halogen, a $C_1$–$C_6$ alkyl group that can be further substituted with one or more halogens, or a phenyl group containing at least one halogen; and m=1–4. Preferably, the optical waveguide devices further comprises a second polymer clad, wherein the second polymer clad comprises a constitutional unit contributed by a monomer chosen from the group consisting of a halocatechol diacrylate, a haloresorcinol diacrylate, and a halohydroquinone diacrylate. Preferably, the monomer of the second polymer clad is chosen from the group consisting of

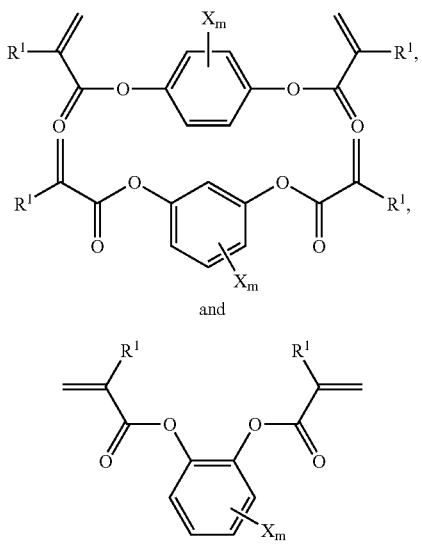

and wherein X is a halogen; $R^1$ is independently at each occurrence a hydrogen, a halogen, a $C_1$–$C_6$ alkyl group that can be further substituted with one or more halogens, or a phenyl group containing at least one halogen; and m=1–4. In many embodiments, the polymer core is an electro-optic polymer. When the core is an electro-optic polymer, the monomer of the first clad may be chosen, for example, from the group consisting of

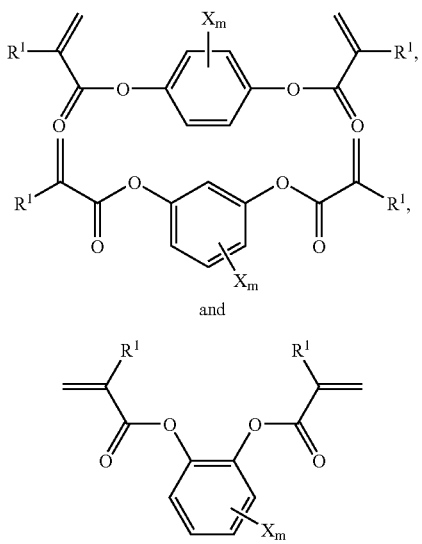

and wherein X is a halogen; $R^1$ is independently at each occurrence a hydrogen, a halogen, a $C_1$–$C_6$ alkyl group that can be further substituted with one or more halogens, or a phenyl group containing at least one halogen; and m=1–4. Preferably, the thickness of the polymer clad is from about 1 μm–about 5 μm and the thickness of the electro-optic polymer core is from about 1 μm–about 5 μm. The electro-optic core may be in the form of, for example, a rib, trench, quasi-rib, or quasi-trench.

In other embodiments when the core polymer is an electro-optic polymer, the clad polymer may further comprise a constitutional unit that includes a charge transport moiety. Charge transporters are known in the art of, for example, organic light emitting diodes and may comprise electron transporters, hole transporters, or a combination of electron and hole transporters. Preferably, the charge transport moiety comprises a hole transporter. The hole transporter may include, for example, an amine substituted with at least two aryl groups, wherein each aryl group may be further independently substituted with one or more halogens, alkyl, heteroalkyl, aryl, or heteroaryl groups. Preferably, the hole transporter comprises a carbazole that may be further independently substituted with one or more halogens, alkyl, heteroalkyl, aryl, or heteroaryl groups, a diphenyl amine that may be further independently substituted with one or more halogens, alkyl, heteroalkyl, aryl, or heteroaryl groups; a triphenyl amine that may be further independently substituted with one or more halogens, alkyl, heteroalkyl, aryl, or heteroaryl groups; or a tetraphenylbenzidine that may be further independently substituted with one or more halogens, alkyl, heteroalkyl, aryl, or heteroaryl groups.

When the second polymer clad comprises a constitutional unit contributed by a monomer chosen from group consisting of a halocatechol diacrylate, a haloresorcinol diacrylate, and a halohydroquinone diacrylate, preferably the polymer core is an electro-optic polymer. Preferably, the thickness of the polymer clad is from about 1 μm–about 5 μm, the thickness of the electro-optic polymer core is from about 1 μm–about 5 μm, and the thickness of the second polymer clad is from about 1 μm–about 5 μm. The electro-optic core may be in the form of, for example, a rib, trench, quasi-rib, or quasi-trench.

In another embodiment, an optical waveguide device comprises at least one polymer clad and a polymer core, wherein the polymer clad comprises a constitutional unit that includes a charge transport moiety and the polymer core is an electro-optic polymer. Preferably, the charge transport moiety comprises a hole transporter. The hole transporter may include, for example, an amine substituted with at least two aryl groups, wherein each aryl group may be further independently substituted with one or more halogens, alkyl, heteroalkyl, aryl, or heteroaryl groups. Examples of hole transporters that include an amine substituted with at least two aryl groups include a carbazole that may be further independently substituted with one or more halogens, alkyl, heteroalkyl, aryl, or heteroaryl groups; a diphenyl amine that may be further independently substituted with one or more halogens, alkyl, heteroalkyl, aryl, or heteroaryl groups; a triphenyl amine that may be further independently substituted with one or more halogens, alkyl, heteroalkyl, aryl, or heteroaryl groups; or an tetraphenylbenzidine that may be further independently substituted with one or more halogens, alkyl, heteroalkyl, aryl, or heteroaryl groups. In other embodiments, the optical waveguide device further comprises a second polymer clad, wherein the second polymer clad comprises a constitutional unit that includes a charge transport moiety. Preferably, the charge transport moiety for the second polymer clad comprises a hole transporter. The hole transporter may include, for example, an amine substituted with at least two aryl groups, wherein each aryl group may be further independently substituted with one or more halogens, alkyl, heteroalkyl, aryl, or heteroaryl groups.

Examples of hole transporters that include an amine substituted with at least two aryl groups include a carbazole that may be further independently substituted with one or more halogens, alkyl, heteroalkyl, aryl, or heteroaryl groups; a diphenyl amine that may be further independently substituted with one or more halogens, alkyl, heteroalkyl, aryl, or heteroaryl groups; a triphenyl amine that may be further independently substituted with one or more halogens, alkyl, heteroalkyl, aryl, or heteroaryl groups; or an tetraphenylbenzidine that may be further independently substituted with one or more halogens, alkyl, heteroalkyl, aryl, or heteroaryl groups. Preferably, the thickness of the polymer clad is from about 1 μm–about 5 μm, the thickness of the electro-optic polymer core is from about 1 μm–about 5 μm, and the thickness of the second polymer clad is from about 1 μm–about 5 μm. The electro-optic core may be in the form of, for example, a rib, trench, quasi-rib, or quasi-trench.

Another embodiment is a polymer including a constitutional unit contributed by a first monomer and a constitutional unit contributed by second monomer, the first monomer comprising a halocatechol diacrylate, a haloresorcinol diacrylate, or a halohydroquinone diacrylate and the second monomer comprising a charge transporting moiety. Preferably, the first monomer is chosen from the group consisting of

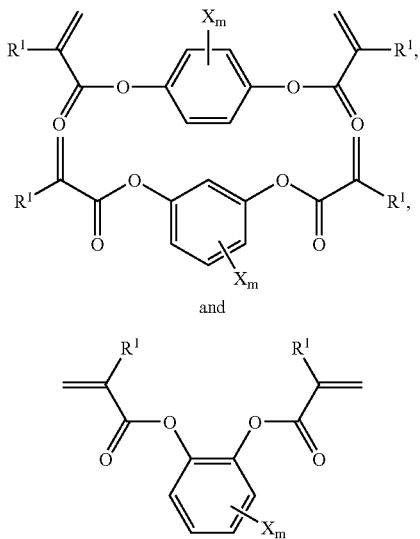

and wherein X is a halogen; $R^1$ is independently at each occurrence a hydrogen, a halogen, a $C_1$–$C_6$ alkyl group that can be further substituted with one or more halogens, or a phenyl group containing at least one halogen; and m=1–4. In another embodiment, the charge transport moiety may be as described above.

Another embodiment is a process comprising a) providing a mixture including i) a halocatechol diacrylate, a haloresorcinol diacrylate, or a halohydroquinone diacrylate component, ii) a charge transporting component having a radical polymerizable group, and iii) a radical initiator, and b) initiating a radical polymerization. The mixture may further comprise, for example, a solvent. Preferably, the solvent includes a radical polymerizable group. In one embodiment, the solvent comprises an acrylate. Preferably, the solvent comprises benzyl acrylate, benzyl methacrylate, phenethyl acrylate, and phenyl methacrylate. The diacrylate component may be chosen from the group consisting of

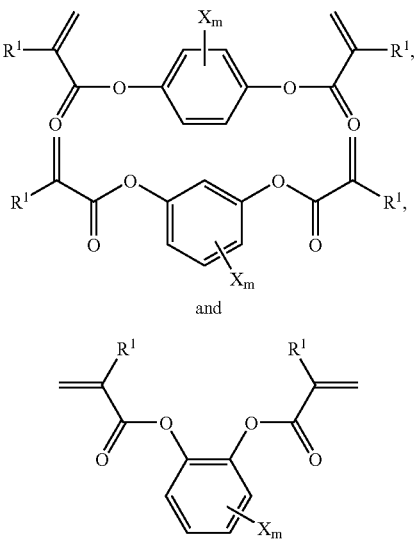

and wherein X is a halogen; $R^1$ is independently at each occurrence a hydrogen, a halogen, a $C_1$–$C_6$ alkyl group that can be further substituted with one or more halogens, or a phenyl group containing at least one halogen; and m=1–4. Preferably, the charge-transporting component comprises hole transporter. The hole transporter may be as described above. In many embodiments, the polymerizable group of the charge-transporting component comprises a vinyl group or an acrylate group. The initiator in the process described above may comprise, for example, a photoradical generator. Preferably, the photoradical initiator comprises acetophenone, propiophenone, or benzophenone.

In the process described above, the mixture may further comprise, for example, a high molecular weight compound or oligomer that is substituted with at least one acrylate or vinyl group. Examples of high molecular weight compounds or oligomers are poly(ethylene glycol) dimethacrylate, poly(ethyleneglycol) methacrylate, poly(ethylene glycol) methyl ether methacrylate, poly(ethylene glycol) divinyl ether, poly(ethylene glycol)-bisphenol A diglycidyl ether adduct tetra (methacrylate), 2,2',6,6'-tetrabromobisphenol A ethoxylate (1 EO/phenol) diacrylate, a bisphenol A propoxylate glycerolate diacrylate, bisphenol F ethoxylate (2 EO/phenol) diacrylate, bisphenol A propoxylate glycerolate diacrylate, fluorescein O,O'-diacrylate, neopentyl glycol propoxylate (1 PO/OH) diacrylate, pentaerythritol diacrylate monostearate, trimethylolpropane benzoate diacrylate, trimethylolpropane ethoxylate (1 EO/OH) methyl ether diacrylate, and trimethylolpropane propoxylate triacrylate.

EXAMPLES

The following example(s) is illustrative and does not limit the Claims.

Example 1

Synthesis of 4-chloro-1,3-phenylene diacrylate

To a solution of 4-chlororesorcinol (86.76 g, 0.60 mol) in anhydrous THF (750 mL) in a 2-liter three neck round bottom flask equipped with dry nitrogen purge, thermocouple, condenser, and ice-water bath, triethylamine (163.6 g, 1.62 mol) in anhydrous THF (100 mL) was added dropwise in 10 minutes. After 10 minutes, acryloyl chloride (136 g, 1.5 mol) in anhydrous THF (300 mL) was added dropwise in 30–60 minutes (maintain 0–5 C of the solution). A precipitate formed immediately, and the mixture was warmed to room temperature and stirred overnight (~15 hrs). The resulting mixture was filtered to remove the solid, and the filtrate was concentrated by rotary evaporation to give a darkly colored viscous liquid. The liquid was dissolved in methylene chloride (200 mL), cooled in an ice bath, washed with 1.0 N sodium hydroxide until pH>10, washed with 1.0 N HCl until pH<2, washed with DI water until pH>5, and dried over anhydrous sodium sulfate. The compound was purified by column chromatography and vacuum concentrated at room temperature to give a pale yellow or colorless liquid.

Example 2

Preparation of UV-Curable Liquid Comprising a Haloresorcinol Diacrylate

A homogeneous, viscous solution was prepared by combining 6.00 g of 4-chloro-1,3-phenyldiacrylate (prepared above), 4.00 g of 2-phenylethylacrylate, and 0.020 g of 2-methyl-4'-(methylthio)-2-morpholinopropiophenone (Aldrich). The composition was cured by exposure to UV light with a wavelength of 365 nm under ambient conditions. The UV-cured composition has a refractive index of 1.550 and an optical loss <1.0 dB/cm at 1550 nm.

Example 3

Preparation of a UV-Curable Liquid Comprising a Haloresorcinol Diacrylate and a Charge Transporter A homogeneous, viscous solution was prepared by combining 10.00 g of 4-chlorophenyldiacrylate, 3.33 g of 9-vinylcarbazole (Aldrich), and 0.27 g of 2-methyl-4'-(methylthio)-2-morpholinopropiophenone (Aldrich). The composition was cured after exposure to UV light with a wavelength of 365 nm under ambient conditions. The UV-cured material had a refractive index of 1.580 at 1550 nm.

Example 4

Fabrication of an Electro-Optic Polymer Waveguide

Polymer electro-optic devices were prepared by spin coating the solution prepared in Example 3 on a six-inch silicon wafer patterned with a gold bottom electrode. The polymer was cured by exposure to 365 nm light to form an approximately 3 μm bottom clad. The bottom clad was dry etched to provide a trench in the form of a Mach-Zehnder interferometer. The trench depth was approximately 0.8 μm. A solution of a nonlinear optical chromophore (Compound 8, FIG. 3 in U.S. Pat. No. 6,750,603) in APC was spin deposited on the bottom clad and baked in a vacuum oven to remove traces of the spinning solvent to give the waveguide core. The thickness of the layer above the trench was approximately 3 μm. A solution as prepared in Example 3 was spin deposited on the waveguide core and UV-cured at 365 nm to give the top clad. The thickness of the top clad was approximately 3 μm. A top electrode was deposited and the devices were poled to give electro-optic polymer waveguides. The devices had a $V_\pi$ roughly one-half that of analogous devices made with the commercial polymer UV-15LV, and the DC bias drift was much less.

Other embodiments are within the following claims.

What is claimed is:

1. An optical waveguide device comprising an electrode, and at least one polymer clad and a polymer core, wherein the polymer clad is located between the electrode and the polymer core; and wherein the polymer clad comprises a constitutional unit contributed by a monomer chosen from the group consisting of a halocatechol diacrylate, haloresorcinol diacrylate, and a halohydroquinone diacrylate;

wherein the polymer core is an electro-optic polymer;

wherein the monomer is chosen from the group consisting of

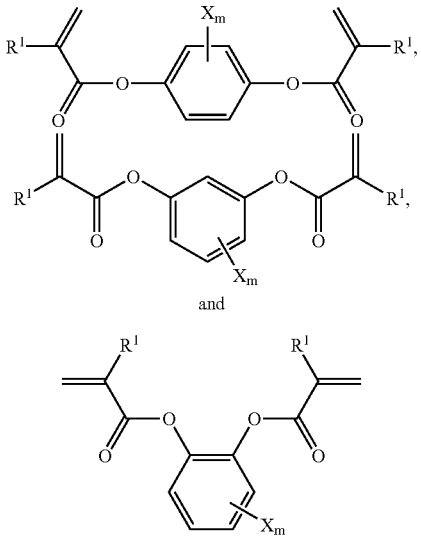

wherein X is a halogen; $R^1$ is independently at each occurrence a hydrogen, a halogen, a $C_1$–$C_6$ alkyl group that can be further substituted with one or more halogens, or a phenyl group containing at least one halogen; and m=1–4;

wherein the polymer clad further comprises a constitutional unit that includes a charge transport moiety;

wherein the charge transport moiety comprises a hole transporter;

wherein the hole transporter includes a) an amine substituted with at least two aryl groups, wherein each aryl group may be further independently substituted with one or more halogens, alkyl, heteroalkyl, aryl, or heteroaryl groups; or b) a carbazole that may be further independently substituted with one or more halogens, alkyl, heteroalkyl, aryl, or heteroaryl groups, a diphenyl amine that may be farther independently substituted with one or more halogens, alkyl, heteroalkyl, aryl, or heteroaryl groups, a triphenyl amine that may be further independently substituted with one or more halogens, alkyl, heteroalkyl, aryl, or heteroaryl groups, or an tetraphenylbenzidine that may be further independently substituted with one or more halogens, alkyl, heteroalkyl, aryl, or heteroaryl groups.

* * * * *